(12) United States Patent
Rankin (10) Patent No.: US 10,728,220 B2
(45) Date of Patent: Jul. 28, 2020

(54) SYSTEM AND METHOD FOR COVERTLY TRANSMITTING A PAYLOAD OF DATA (71) Applicant: John Rankin, Morgantown, WV (US)

(72) Inventor: John Rankin, Morgantown, WV (US)

( * ) Notice: Subject to any disclaimer, the term of this patent is extended or adjusted under 35 U.S.C. 154(b) by 0 days.

(21) Appl. No.: 16/534,511

(22) Filed: Aug. 7, 2019

(65) Prior Publication Data
US 2020/0053052 A1 Feb. 13, 2020

Related U.S. Application Data (60) Provisional application No. 62/717,202, filed on Aug. 10, 2018.

(51) Int. Cl.
*H04L 29/06* (2006.01)
*H04L 29/12* (2006.01)
*H04L 12/66* (2006.01)

(52) U.S. Cl.
CPC ...... *H04L 63/0414* (2013.01); *H04L 61/6095* (2013.01); *H04L 69/164* (2013.01); *H04L 12/66* (2013.01)

(58) Field of Classification Search
CPC ............. H04L 63/0414; H04L 61/6095; H04L 69/164
See application file for complete search history.

(56) References Cited

U.S. PATENT DOCUMENTS

| | | |
|---|---|---|
| 3,688,090 A | 8/1972 | Rankin |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 7,215,684 B1 | 5/2007 | Rosen et al. |
| 8,374,091 B2 | 2/2013 | Chiang |
| 8,397,151 B2 | 3/2013 | Salgado et al. |
| 9,350,663 B2 | 5/2016 | Rankin |
| 2001/0017844 A1 | 8/2001 | Mangin |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2005/0286517 A1 | 12/2005 | Babbar et al. |
| 2006/0002681 A1 | 1/2006 | Spilo et al. |

(Continued)

FOREIGN PATENT DOCUMENTS

CN 103841118 A 6/2014

OTHER PUBLICATIONS

Arkin, (ICMP Usage in Scanning—The Complete Know How, Jun. 2001, 218 pages) (Year: 2001).*

(Continued)

*Primary Examiner* — Oleg Korsak
(74) *Attorney, Agent, or Firm* — Standley Law Group LLP; Jeffrey S. Standley; Adam J. Smith (57) ABSTRACT

A system and method for covertly transmitting a payload of data within a network is provided. A blind host located along a communication pathway of the network between an origin host and a destination host is selected. A datagram is constructed which includes the payload and a source address field containing an address for the destination host. The datagram is constructed to trigger creation of an error message upon receipt at the blind host.

20 Claims, 5 Drawing Sheets

(56) References Cited

U.S. PATENT DOCUMENTS

| | | |
|---|---|---|
| 2006/0034317 A1 | 2/2006 | Hong et al. |
| 2006/0133364 A1 | 6/2006 | Venkatsubra |
| 2007/0223395 A1 | 9/2007 | Lee et al. |
| 2010/0103830 A1 | 4/2010 | Salgado et al. |
| 2011/0149891 A1 | 6/2011 | Ramakrishna |
| 2011/0231564 A1 | 9/2011 | Korsunsky et al. |
| 2012/0117376 A1 | 5/2012 | Fink et al. |
| 2012/0243539 A1 | 9/2012 | Keesara |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0343377 A1 | 12/2013 | Stroud et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2016/0269294 A1 | 9/2016 | Rankin |
| 2017/0090872 A1 | 3/2017 | Mathew et al. |
| 2018/0018147 A1 | 1/2018 | Sugawara |
| 2018/0102975 A1 | 4/2018 | Rankin |

OTHER PUBLICATIONS

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Thyer, J., Covert Data Storae Channel Using IP Packet Headers, SANS Institute, Information Security Reading Room, Jan. 30, 2008.

\* cited by examiner

SYSTEM AND METHOD FOR COVERTLY TRANSMITTING A PAYLOAD OF DATA

CROSS-REFERENCE TO RELATED APPLICATIONS

This application claims the benefit of U.S. Application Ser. No. 62/717,202 filed Aug. 10, 2018, the disclosures of which are hereby incorporated by reference as if fully restated herein.

TECHNICAL FIELD

Exemplary embodiments relate generally to a system and method for covertly transmitting a payload of data.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate using TCP/IP standards, or formats, to transfer or share data. TCP/IP rules are generally established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" is any program or application that initiates requests for, or sends, information from one remote location to another. As used herein, the term "client" may refer to applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon—also sometimes referred to interchangeably as a server or service—is generally a software component of a device that runs a background process. As used herein in relation to the operation of the TCP protocol, the term "daemon" is used to refer to a component of a networked device that sends (source daemon) or receives (destination daemon), and processes communications between remote clients according to the TCP standard.

A host is a device or system that runs or executes TCP/IP daemons. As used herein, the term "host" refers to any such device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, it breaks the data stream into smaller pieces called segments (sometimes referred to as datagrams or packets) for transmission to a requesting client. The protocol generally calls for the use of checksums, sequence numbers, timestamps, time-out counters and retransmission algorithms to ensure reliable data transmission.

The IP layer actually performs the communication function between two networked hosts. The IP software receives data segments from the TCP layer, ensures that the segment is sized properly to meet the requirements of the transmission path and physical adapters (such as Ethernets and CTCs). The IP layer changes the segment size, if necessary, by breaking the segment down into smaller datagrams, and transmits the data to the physical network interface or layer of the host.

The network connecting devices are generally called gateways. These gateways communicate between themselves for control purposes. Occasionally, a gateway or destination host will communicate with a source host, for example, to report an error in datagram processing. For such purposes the Internet Control Message Protocol (ICMP) is used.

If the objective is to use the Internet service protocols to covertly deliver a payload, the payload's point of origin should remain secret and unobserved. Current protocols either expressly make the origin of a data payload known or easy to obtain. While it is possible to mask the payload transmission through encryption or other deceptive means, the discovery and observation might well lead back to the host of origin even if the payload is undeterminable. In other words, for a payload of data to be truly covert, the point of origin should be masked, potentially in addition to other protections offered during transmission.

Therefore, what is needed is a system and method for delivering information from one host to another while masking the payload's point of origin. The present disclosure provided a system and method for covertly transmitting a payload of data from one host to another by making the payload's point of origin.

One of the most effective methods to mask operational functions is to utilize the underlying TCP/IP protocols as they were designed, without alteration or augmentation. Furthermore, when properly implemented, the disclosed system and method may utilize an unsuspecting host as a supplanted replacement for the point of origin without the host's knowledge or participation. A discrete unit of information (the "payload") may be transmitted from an origin host to a destination host by way of a blind host. Preferably, the blind host is unaware of its involvement. The traffic coming from the blind host may appear to be the sole origin of the data. The blind host may have no record of the existence of the origin host. The net result of the process may be the delivery of a payload which appears to have originated at the blind host. In this way, the location and identify of the payload's true point of origin, the origin host, may remain undisclosed.

Such covert transmissions may be accomplished by using the blind host's requirement to produce error messages when it receives network traffic that appears to be in error. The origin host may create a datagram that contains a payload of information intended for covert delivery to the destination host. Rather than send this datagram directly to the destination host, the origin host may be configured to direct the traffic to the blind host. However, the source addresses in the datagram header may indicate that the datagram originated at the destination host. Furthermore, the datagram may intentionally contain a fatal flaw that will require the blind host to generate an error message and return it to the address indicated as the source—i.e., the destination host. Since the source address within the datagram in error indicates the destination host's address, the blind host may transmit the error message to the destination host. The error message may contain enough of the original datagram to include the payload intended to reach the destination host covertly.

By using this blind bounce back technique, it is possible to communicate between two hosts without directly forming a communication path or revealing the true origin of the message(s) containing the payload. By intentionally creating an error within the datagram with the incorrect source address, the blind host may bounce the message containing the payload back to a location that did not originate the message. The resulting process may leave the true origin of the message undetectable by involving an unrelated and unwitting participant in the transmission.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
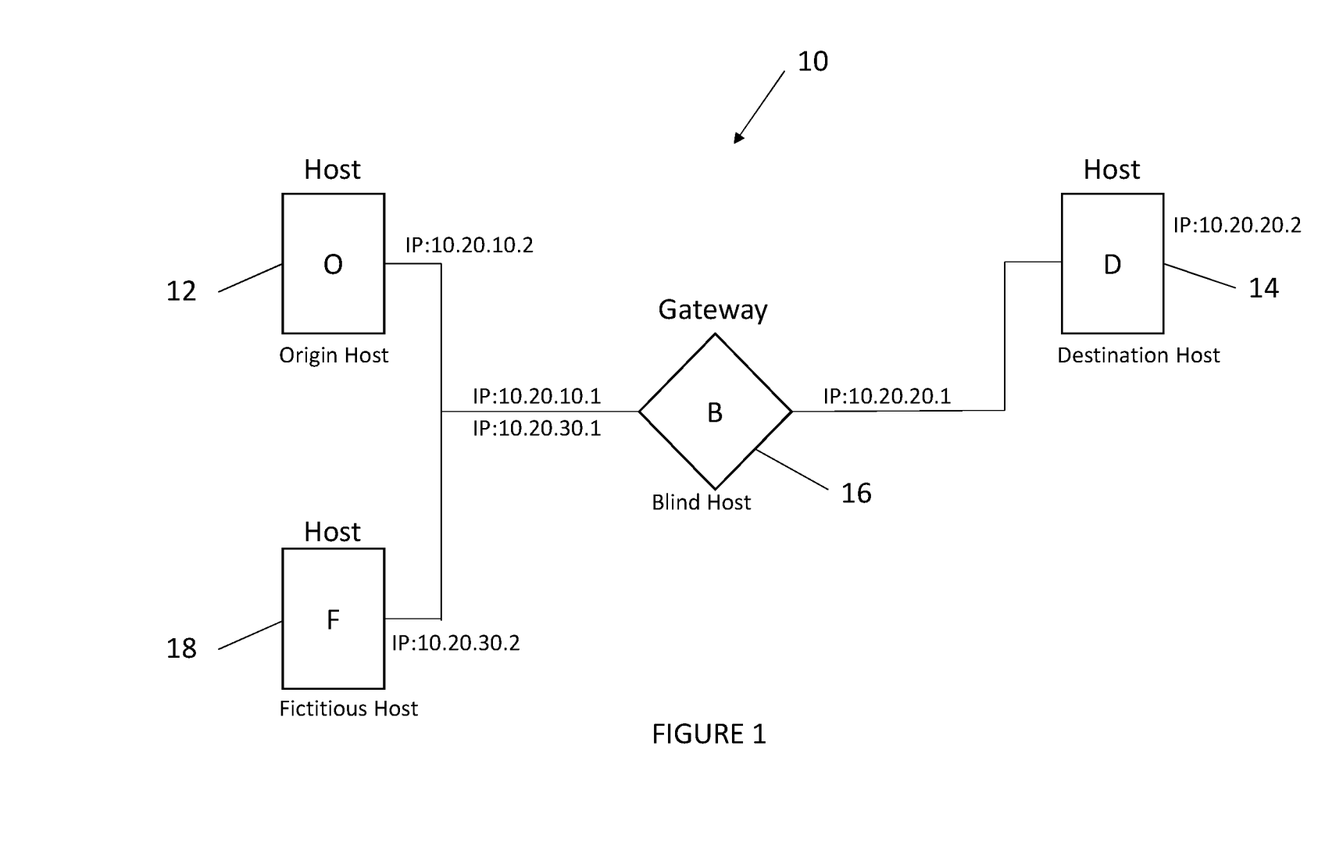
FIG. 1 is a simplified block diagram of a system connecting hosts in a network.

FIG. 1 is a simplified block diagram of a system connecting hosts 12, 14, 16, and 18 in a network 10. The network 10 may comprise a number of hosts 12, 14, 16, and 18. The hosts 12, 14, 16, and 18 may be placed in electronic communication with one another in a direct or indirect fashion. In exemplary embodiments, without limitation, the network 10 is an IP network such as the world wide web, though any type of internet, intranet, or other type of network is contemplated. Each host 12, 14, 16, and 18 may be a personal electronic device such as, but not limited to, a computer, server, laptop, desktop computer, database, smartphone, tablet, e-reader, some combination thereof, or the like. Such interconnected hosts 12, 14, 16, and 18 may include one or more origin hosts 12, one or more destination hosts 14, one or more blind hosts 16, and one or more fictitious hosts 18.

The origin host 12 may be a machine on the network 10. The origin host 12 may, in exemplary embodiments without limitation, operate simply as a host and not necessarily a gateway, though such is contemplated. The origin host 12 may originate the payload that is to be covertly transmitted to the destination host 14. As such, it may be desirable to conceal the relationship and identity of the origin host 12 in such transmission(s).

The destination host 14 may be a machine on the network 10. The destination host 14 may operate simply as a host and not necessarily a gateway, though such is contemplated. The destination host 14 may be the intended, and/or actual, recipient of the payload that originates at the origin host 12.

The blind host 16 may be a machine on the network 10. The blind host 16 may operate as a correctly implemented network gateway host. The blind host 16 may have a transmission path to both the destination host 14 and the origin host 12. This transmission path does not need to be on the same electric or wireless path, but must be reachable within the blind host's 16 gateway operations. Stated another way, the transmission path may be direct or indirect such that other gateways may be located between the blind host 16 and the destination host 14 and/or the origin host 12. The blind host 16 does not need to have previous knowledge of the other hosts 12, 14, and 18. The blind host 16 may not have any further interaction with the other hosts 12, 14, and 18 after transmission of the payload is performed.

The fictitious host 18 may be a machine that may or may not actually exist on the network 10 or elsewhere. In exemplary embodiments, without limitation, the fictitious host 18 is only necessary to provide a plausible reference address within the network 10. The fictitious host's 18 address may be plausibly reachable by the blind host 16 or some additional gateway series connected to the blind host 16 such that data from the fictitious host's 18 address is plausibly reachable from the blind host 16.

Figure 2:
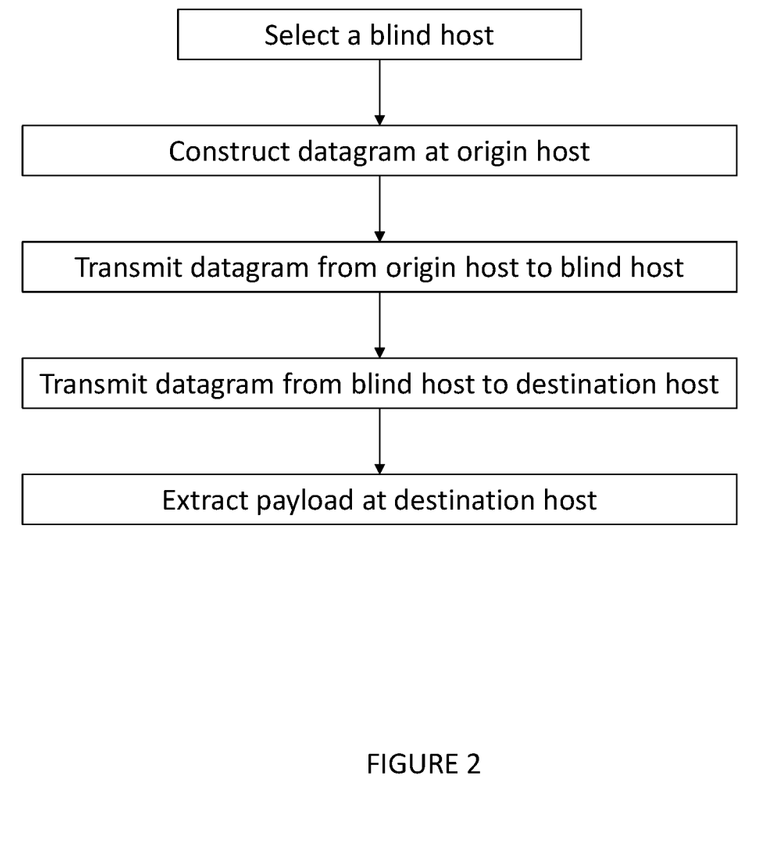
FIG. 2 is a flowchart with exemplary logic for covertly transmitting a payload.
Figure 3:
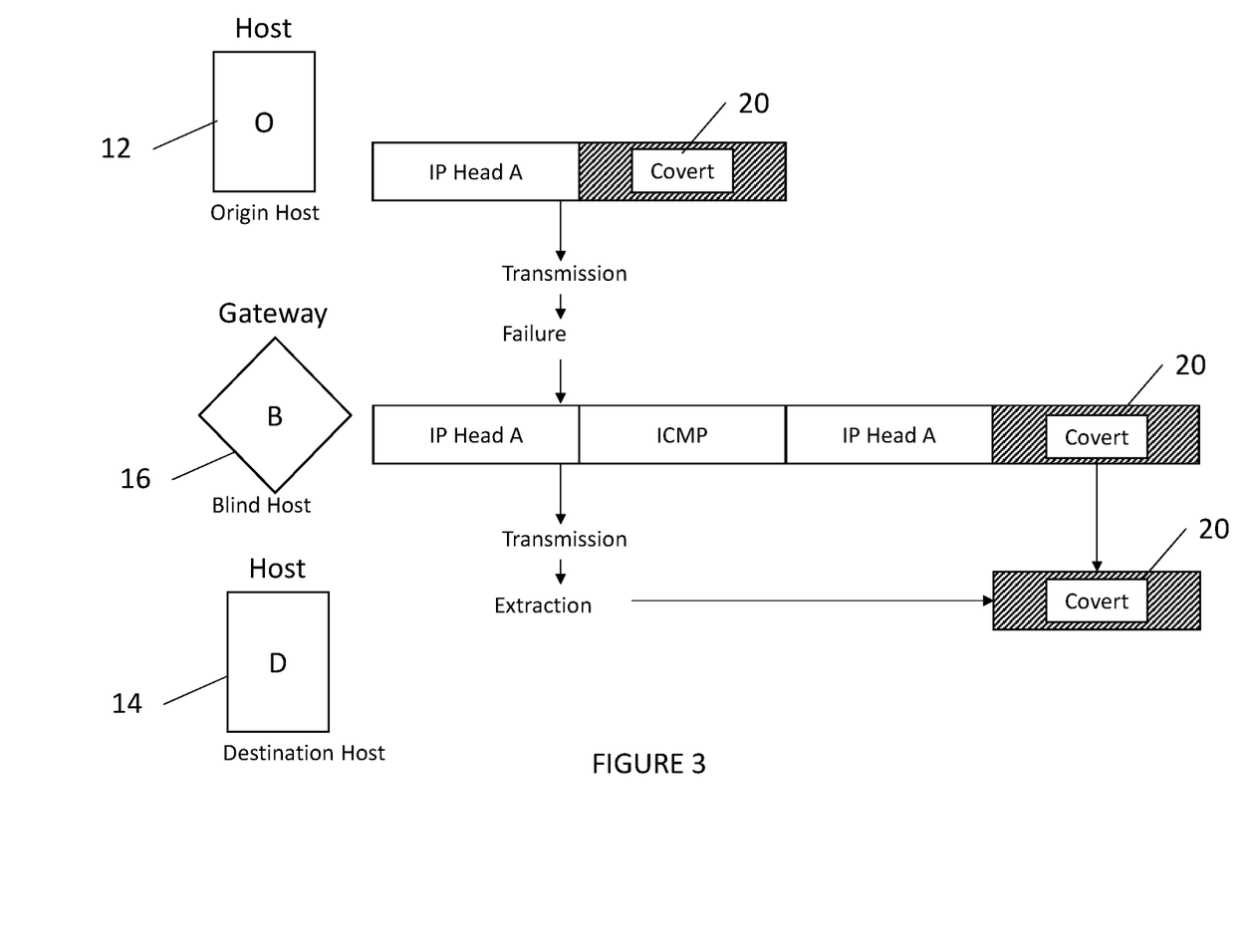
FIG. 3 is an illustration of an operation action for covertly transmitting the payload.

FIG. 2 is a flowchart with exemplary logic for covertly transmitting a payload 20. FIG. 3 is an illustration of an operation action for covertly transmitting the payload 20. The origin host 12 may carefully select the appropriate host to unwittingly act as the blind host 16. The blind host 16 may have at least the following exemplary characteristics, which are provided without limitation.

The blind host 16 may be a correctly implemented gateway for the network 10. The blind host 16 may be configured to produce properly formatted error messages based upon erroneous network traffic. The blind host 16 may be configured to produce such error messages in conformance with various ICMP protocols, such as those defined by RFC 792, though any protocol is contemplated.

Alternatively, or additionally, the blind host 16 may be reachable from the origin host 12, the destination host 14, and the fictitious host 18. In this way, it may be plausible that datagram(s) received from the blind host 16, including the datagram(s) 30 containing the payload(s) 20, could plausibly have arrived from any of these hosts 12, 14, and 18 and plausibly have been routed or rerouted back to any or all of these hosts 12, 14, and 18. Stated another way, the blind host 16 may be placed along a communication pathway extending between the origin host 12, the destination host 14, and the address for the fictitious host 18 (as the fictitious host 18 may not actually exist on the network 10 or elsewhere).

The origin host 12 may be configured to determine the position that the blind host 16 holds within the communication pathway between the origin host 12 and the destination host 14. Because the origin host 12 may be configured to intentionally create a datagram 30 that will produce an error message when processed at the blind host 16, the number of additional gateway transfers between at least the origin host 12 and the blind host 16 may need to be determined or otherwise known. In the exemplary embodiment illustrated in FIG. 1, the blind host 16 holds a position of 1, as there are no other gateways necessary for routing between the origin host 12 and the destination host 14. However, any position for the blind host 16 is contemplated as any number of gateways may exist between the origin host 12 and the destination host 14. The reason for determining or knowing the position of the blind host 16 is further explained herein.

Figure 4:
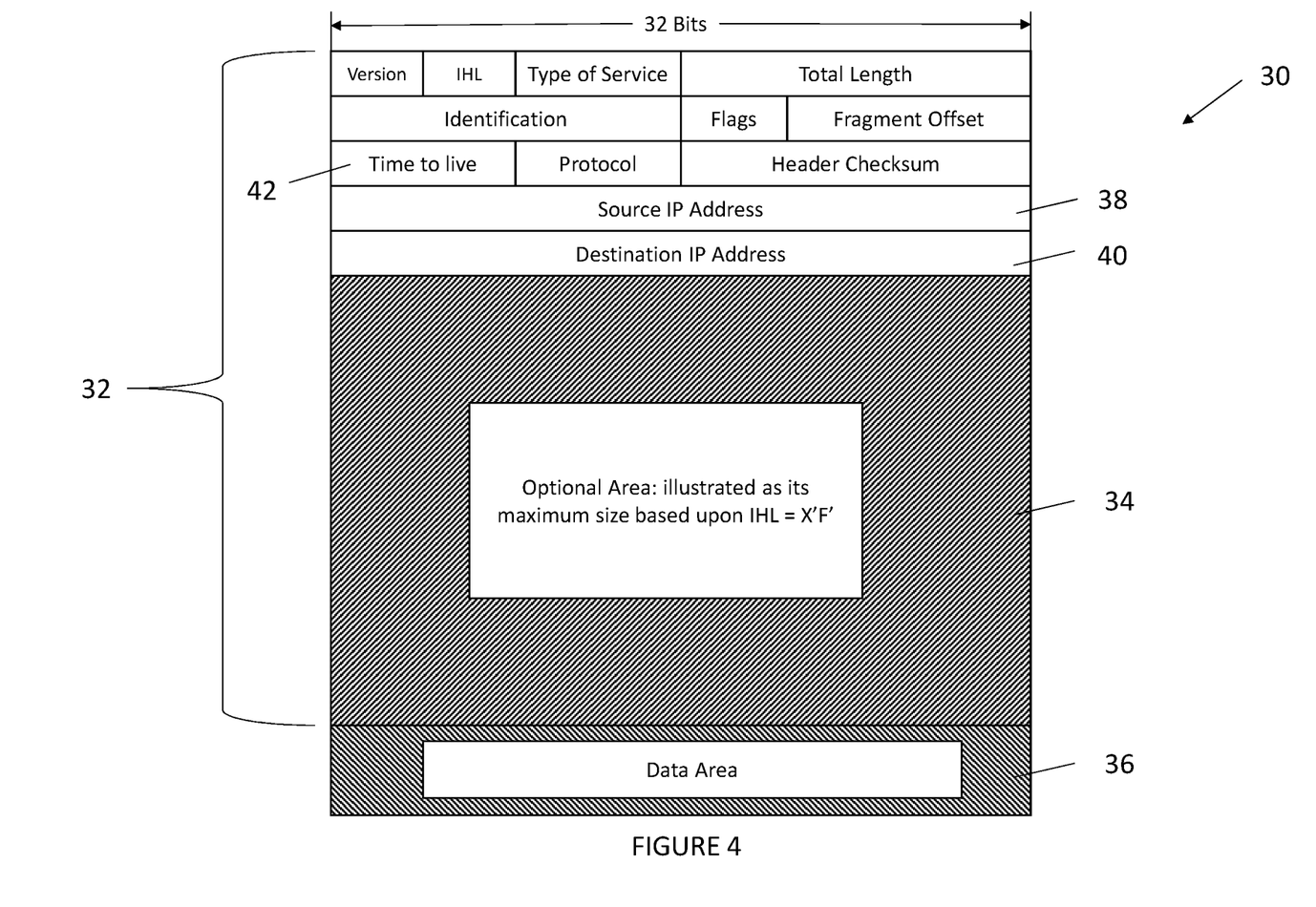
FIG. 4 is a simplified visual representation of an exemplary datagram.
Figure 5:
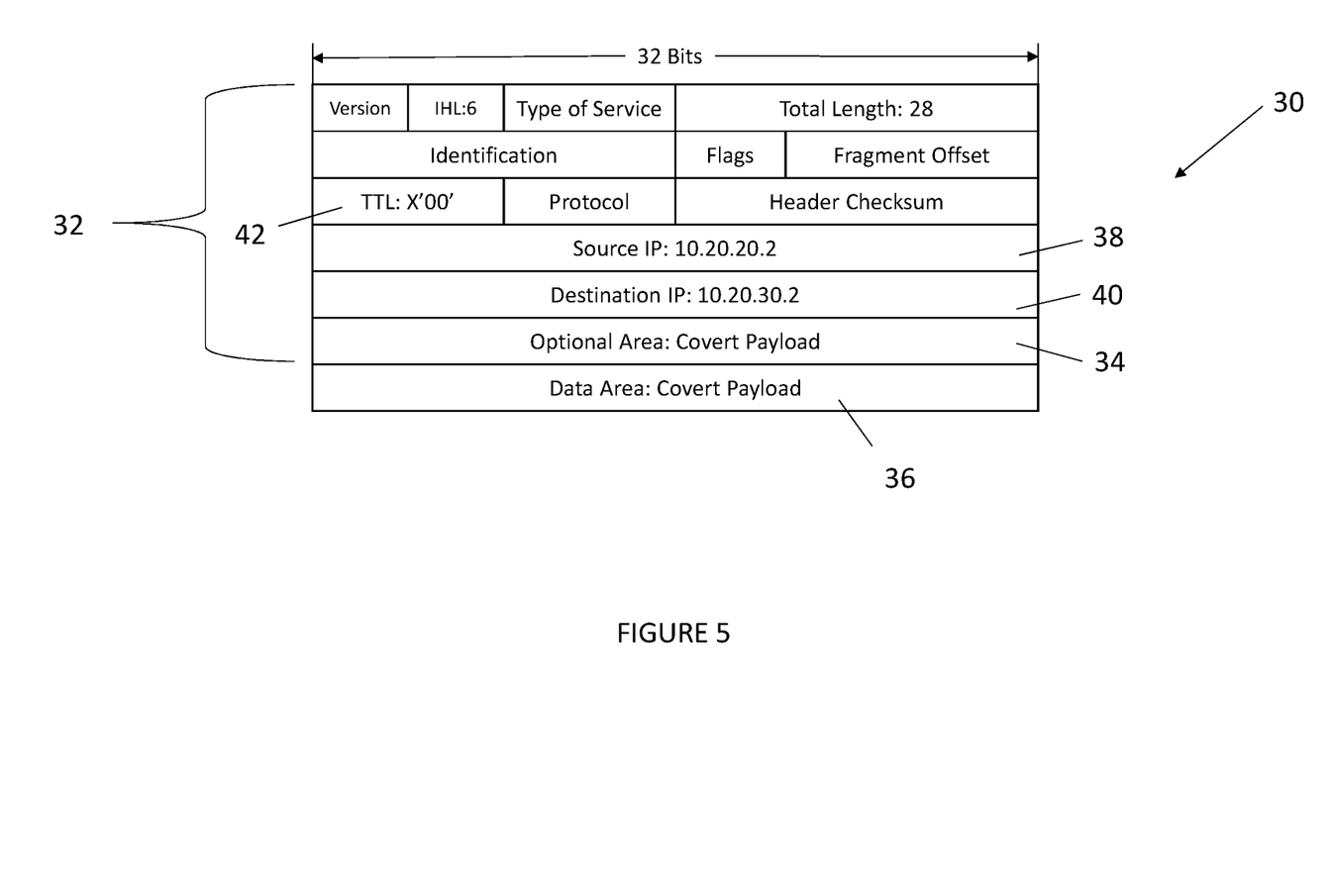
FIG. 5 is another simplified visual representation of the exemplary datagram of FIG. 4.

FIG. 4 is a simplified visual representation of an exemplary a datagram 30. FIG. 5 is a simplified visual representation of an exemplary header 32 for the datagram 30 of FIG. 4. The origin host 12 may be configured to create a unit of information, the datagram 30, containing the payload 20 to be transmitted to the destination host 14. The payload 20 may be limited in size and location. In other exemplary embodiments, the payload 20 may be spread across multiple datagrams 30. The payload 20 may be wholly contained within an optional area 34 of the header 32 and/or within the data area 36 that immediately follows the header of the datagram 30. In exemplary embodiments, the datagram 30 may be an IP datagram. The datagram 30 may be properly formatted in conformance with at least RFC 791, though other standards, protocols, sizes, configurations, and types of datagrams 30 are contemplated. The data area 36 may be 64 bits in size, though any size is contemplated. The header 32 may be 32 bits in size, though any size is contemplated.

While this might, at first glance, seem a restrictively small amount of payload, there is ample room within the optional area 34 of the header 32 itself. For example, without limitation, in exemplary embodiments with the full optional area 34 and data area 36 of 64 bits in size following the header 32 utilized, a total payload 20 of 12 full words, or 48 bytes, may be available.

The origin host 12 may be configured to create the datagram 30 that will contain the encapsulated payload 20 intended for covert transmission. It is contemplated that the payload 20 may be further secured by encryption, password, or the like, though such is not required. The datagram 30 may have a specially designed construction to engage certain actions at the blind host 16, such as but not limited to, generation of an error message upon receipt and processing. The blind host 16, which may be configured to follow the protocol rules, may be forced to generate a transmission containing the payload 20 to the destination host 14. Furthermore, the datagram 30 may be constructed such that no relationship or identifying information regarding the origin host 12 may be contained within the datagram 30 such that the origin host's 12 identity is concealed from the destination host 14.

The datagram 30 may comprise a source address 38. The source address 38 may identify the address of the destination host 14. In exemplary embodiments, the address may be an IP address, though any type or kind of address is contemplated. The datagram 30 itself may contain some property that will cause the blind host 16 to generate an error message. In exemplary embodiments, this property may be configured to create an error under ICMP rules, though other protocols, rules, standards, and the like are contemplated. In this way, the blind host 16 may be programmed to send an error message and that message may be directed to the source address 38, which may be the address of the destination host 14. The idea here is that the blind host 16 may receive a transmission that it finds in error. Following the ICMP rules, the blind host 16 may generate and send an error message back to the host it believes created the error in the first place. Since the destination host's 14 address may be provided in the source address field 38, the blind host 16, following the protocols, may assume that the destination host 14 is the origin of the transmission and may report its discovered error to that address, unwittingly delivering a transmission to the destination host 14.

The destination address 40 may identify the address of the fictitious host 18. In exemplary embodiments, the address may be an IP address, though any type or kind of address is contemplated. This may mask the identity of the origin host 12. If an examination of the traffic is performed, then the fictitious host 18 may appear to be the source of the datagram 30 rather than the origin host 12.

It is possible to cause the blind host 16 to generate the error message in a variety of ways. In exemplary embodiments, the time to live field 42 may contain a value which is configured to generate creation of the error message at the blind host 16. In this way, the transmission from the origin host 12 may force the blind host 16 to generate the error message, preferably in accordance with ICMP, though any rules, protocols, standards, or the like are contemplated. The time to live field 42 on the header 32 is just one example of how to cause creation of the error message and this example is provided without limitation.

As traffic passes through gateways (such as the blind host 16), the value in the time to live field 42 is generally reduced by one. Once a gateway or host receives a datagram 30 that has a zero in the time to live field 42, the gateway or host may be configured to produce an error message for return to the point of origin of the datagram 30 prior to discarding the datagram 30 in question. As such, the origin host 12 may be configured to create the datagram 30 containing the payload 20 with the time to live field 42 containing a value designed to cause the blind host 16 to discard the datagram 30 and send an error message to the address contained in the source address field 38 of the datagram 30. For example, without limitation, where the blind host 16 is the first gateway in the network 10, such as illustrated in FIG. 1, the time to live field 42 may be set to one or zero such that the blind host 16 is configured to generate an error message upon receipt and processing. As another example, without limitation, where the blind host 16 is the third gateway in the network 10, the time to live field 42 may be set of a value of three or less such that the datagram 30 is successfully passed through the first two gateways, but then an error message is generated upon receipt at the third gateway—i.e., at the blind host 16. As such, the origin host 12 may be configured to determine the number of gateways between the origin host 12 and the blind host 16 or such information may be otherwise known to the origin host 12.

Once the datagram 30 comprising some or all of the payload 20 is constructed and transmitted from the origin host 12 to the blind host 16 (directly or through one or more gateways), a series of predetermined behaviors may take place. These behaviors may conform to the defined actions of a properly implemented IP gateway within an IP network, as defined by RFC 791 an RFC 792, though any standard, protocol, rules, or the like are contemplated. After the blind host 16 receives the datagram 30 and determines that the time to live 42 is zero (before or after reducing the time to live 42 value), then the error message may be constructed at the blind host 16. The error message may contain the payload 20 within a copy of the original datagram header 32 and data area 36 following the header 32 as required by protocols, rules, standards, or the like. This error message may be transmitted to the address specified in the source address 38. This address may be the address for the destination host 14. This error message may be transmitted to the destination host 14 having preserved the payload 20 within the error message. The destination host 14, when receiving the error message, may unpack the payload 20 while identity of the origin host 12 may remain undisclosed.

In exemplary embodiments, the error message may list the address of the blind host 16 in the source address field 38 and the address of the destination host 14 in the destination address field 40. While the addresses described herein may be IP addresses, other types, formats, or configurations of addresses are contemplated. Furthermore, while certain actions are described herein with respect to current ICMP protocols, any set of protocols, past, present, or future, are contemplated. Any number of datagrams containing any number of payloads, or a single payload spread across multiple datagrams, is contemplated.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A method for covertly transmitting a payload of data within a network, said method comprising the steps of:
   selecting a blind host, wherein the blind host is located along a communication pathway of the network between an origin host and a destination host;
   constructing a datagram comprising the payload, wherein a source address field of the datagram contains an address for the destination host, and wherein the datagram is configured to trigger creation of an error message at the blind host; and
   transmitting the datagram to the blind host.

2. The method of claim 1 further comprising the steps of:
   generating, at the blind host, the error message, wherein the error message comprises the payload.

3. The method of claim 2 further comprising the steps of:
   transmitting, from the blind host to the destination host, the error message comprising the payload; and
   extracting, at the destination host, the payload from the error message.

4. The method of claim 1 wherein:
   the address for the destination host is an IP address.

5. The method of claim 1 wherein:
   the datagram is configured to trigger creation of the error message at the blind host by setting the time to live field at a value which will trigger generation of the error message at the blind host.

6. The method of claim 1 further comprising the steps of:
   determining the number of gateways between the origin host and the blind host.

7. The method of claim 6 wherein:
   the datagram is configured to trigger creation of the error message upon receipt at the blind host by setting the time to live field at a value which will be zero following receipt at the blind host.

8. The method of claim 1 wherein:
   the blind host is programmed to conform to ICMP protocols.

9. The method of claim 1 wherein:
   the payload is located entirely within a header of the datagram.

10. The method of claim 1 wherein:
    the payload is located within a data area following a header of the datagram.

11. The method of claim 10 wherein:
    the data area is 64 bits in size.

12. The method of claim 1 wherein:
    a destination address field of the datagram contains an address for a fictitious host; and
    the address of the fictitious is plausibly located within the network.

13. A system for covertly transmitting a payload of data within a network, said system comprising:
    one or more gateways, each programmed with protocols;
    an origin host;
    a destination host having an address; and
    a communication pathway within the network and connecting the destination host to the origin host along the one or more gateways;
    wherein said origin host is configured to select one or said one or more gateways to serve as a blind host, construct a datagram comprising the payload and a source address field indicating the address for the destination host, and transmit the datagram to the blind host;
wherein the datagram is configured to trigger creation of an error message at the blind host according to the protocols.

14. The system of claim 13 wherein:
the protocols comprise ICMP protocols.

15. The system of claim 13 wherein:
the protocols comprise one or more rules which configure each of the one or more gateways to reduce a time to live value in the datagram by a predetermined amount following receipt, generate the error message upon receipt of the datagrams if the time to live value is less than a predetermined amount, and transmit the generated error message to the address listed in the source address field.

16. The system of claim 15 wherein:
the origin host is configured to determine the number of the one or more gateways in the network between the origin host and the gateway selected to serve as the blind host; and
the origin host is configured to set a time to live field for the datagram at a value which is configured to cause the blind host, per the protocols, to generate the error message following receipt of the datagram.

17. The system of claim 13 wherein:
the network is an IP network; and
the address for the destination host is an IP address.

18. The system of claim 13 further comprising:
a fictitious host located within the network and along the communication pathway and having an address, wherein the origin host is configured to set a destination address field as the address for the fictitious host.

19. A method for covertly transmitting a payload of data within an IP network, said method comprising the steps of:
selecting a blind host, wherein the blind host is located along a communication pathway of the IP network between an origin host and a destination host and wherein the blind host is programmed with protocols;
constructing a datagram comprising the payload located within at least a header, wherein a source address field of the datagram contains an IP address for the destination host, wherein the destination address field of the datagram contains an IP address for a fictitious host which is plausibly located within the IP network, and wherein the datagram comprises a time to live value configured to trigger creation of an error message upon receipt at the blind host according to the protocols;
transmitting the datagram to the blind host;
generating, at the blind host, the error message comprising the payload pursuant to the protocols;
transmitting, from the blind host to the destination host, the error message; and
extracting, at the destination host, the payload from the error message.

20. The method of claim 19 wherein:
the payload is also located within a data area following the header.

* * * * *